United States Patent [19]

Sayer

[11] Patent Number: 5,379,731
[45] Date of Patent: Jan. 10, 1995

[54] MULTICYCLINDER TWO STROKE CYCLE ENGINE

[75] Inventor: Christopher N. F. Sayer, Ferndale, Australia

[73] Assignee: Orbital Engine Company (Australia) Pty. Limited, Balcatta, Australia

[21] Appl. No.: 142,480

[22] PCT Filed: Jul. 1, 1992

[86] PCT No.: PCT/AU92/00323

§ 371 Date: Dec. 2, 1993

§ 102(e) Date: Dec. 2, 1993

[87] PCT Pub. No.: WO93/01402

PCT Pub. Date: Jan. 21, 1993

[30] Foreign Application Priority Data

Jul. 2, 1991 [AU] Australia .................. PK6965

[51] Int. Cl.$^6$ .................................. F02B 75/02
[52] U.S. Cl. .................. 123/65 PE; 123/65 V
[58] Field of Search ............ 123/65 PE, 65 P, 65 V

[56] References Cited

U.S. PATENT DOCUMENTS

| | | | |
|---|---|---|---|
| 1,924,188 | 8/1933 | Hall | 123/190 |
| 4,391,234 | 7/1983 | Holzleitner | 123/65 |
| 4,541,371 | 9/1985 | Kageyama et al. | 123/65 PE |
| 4,920,932 | 5/1990 | Schlunke | 123/73 C |
| 4,969,329 | 11/1990 | Bolton et al. | 123/65 PE |
| 5,111,778 | 5/1992 | Huang | 123/65 V |
| 5,136,989 | 8/1992 | Sterbenz et al. | 123/65 PE |

FOREIGN PATENT DOCUMENTS

| | | | |
|---|---|---|---|
| 665740 | 9/1929 | France. | |
| 327743 | 4/1930 | France. | |
| 57-68508 | 4/1982 | Japan | 123/65 PE |
| 54-101534 | 6/1984 | Japan | 123/65 PE |
| 62-111117 | 5/1987 | Japan | 123/65 PE |
| 3-192913 | 8/1988 | Japan | 123/65 PE |
| 3-74519 | 3/1991 | Japan | 123/65 PE |
| 3-260322 | 11/1991 | Japan | 123/65 PE |

*Primary Examiner*—David A. Okonsky
*Attorney, Agent, or Firm*—Nikaido, Marmelstein Murray & Oram

[57] ABSTRACT

A two stroke cycle engine cylinder block (9) has exhaust ports (14) controlled by power valves which rotate on an axis extending longitudinally of the block (9). Along this axis the block (9) has a plurality of aligned recesses in which are located bearing members (24) for the power valves. Bores (25) in each bearing member (24) are axially aligned and the bearing members (24) immobily retained in the aligned recesses by assembly of the exhaust manifold (16). Spigots on the power valves are received in the bores (25) and coupled together so that the power valves rotate in unison.

8 Claims, 4 Drawing Sheets

MULTICYCLINDER TWO STROKE CYCLE ENGINE

This invention relates to a two stroke cycle multi-cylinder internal combustion engine, wherein pivotally mounted valves are provided in the exhaust passage of each cylinder for controlling the engine performance.

The design of the mounting of these valves in the respective exhaust passage, and the interconnecting thereof to operate in unison, does present some manufacturing problems, particularly in relation to high volume production of components.

Further, valves located in exhaust passages are subject to an aggressive environment and thus the design of such valves must take account of this factor. The prior art does not disclose an engine provided with a valve having such design characteristics and indeed German Patent No. 3833846 addresses itself only to the location of a pivotally mounted valve on the induction side of the engine where the environment is much less hostile than on the exhaust side.

In particular, it is to be noted that where, as with the present invention, the valve bearings are located on the exhaust side they are subject to higher temperatures and higher velocity gases than exist on the induction side. This invariably leads to a higher deterioration rate of materials and the formation of undesirable leakage paths.

Thus, it is evident that if a prior an construction, having a cylindrical bush located within a supporting body with parallel straight sides, clear leakage paths through the body being evident, were employed there would be a high rate of leakage. Also, as there is a relatively small area of contact between the bush, engine block and exhaust manifold to reduce heat transfer from the bush there would be little prospect of cooling the bush by leading heat away from the bush by conduction. This would inevitably lead to problems in valve performance and potentially, valve failure.

It is also to be noted that having regard to the function of the power valve located in the exhaust port it is subject to more frequent movement with resulting hammer loads on the bearings. Thus a valve mounted on the exhaust side requires more rigid and stable support for the bush than disclosed in the prior art.

Further, the gasket between the exhaust manifold and the engine block needs protection from high point loadings and exposure to hot gases. In such an environment, it is desirable for gaskets to be clamped into position over their full area.

Thus it can be seen that there are numerous problems in applying a prior art valve construction, designed for use on the induction side of an engine to the exhaust side.

It is therefore the object of the present invention to provide an engine of the above type having mountings for the exhaust passage valves that are comparatively simple to manufacture, which is effective in operation and tolerant to interchangeability of components.

With this object in view there is provided in a two stroke cycle internal combustion engine having a cylinder block with one or more cylinders and having a respective exhaust passage communicating with the or each cylinder, a valve member associated with each exhaust passage, said valve members being supported for pivotal movement relative to the respective passage about a common axis extending longitudinally of the block, each said exhaust passage extending to a surface on one side of the cylinder block, and an exhaust manifold having a complementary surface detachably secured to the cylinder block with said surfaces in abutting relation, characterised in that said surface of the cylinder block has a plurality of aligned recesses therein with at least one recess between each two adjacent exhaust passages, a bearing member received in each recess, each bearing member having an aperture therethrough preferably of circular cross section, said recesses and bearing members being configured so that the bearing members are immobiley retained in the recess by the exhaust manifold with the apertures of the bearing members co-axial when the exhaust manifold is secured to the cylinder block, with the respective surfaces in abutting relation, said valve members being rotatably supported in said aligned apertures of the bearing members. Preferably, each bearing member is provided with upper and lower parallel flat faces in direct contact with complementary parallel flat faces in each recess.

Preferably, the base of each recess is provided with a flat face portion parallel to said surface on the side of the cylinder block and the bearing members are also provided with flat surface portions complementary to and abutting the flat face portion at the base of each recess. This flat face portion at the base of the recess provides a reference surface with respect to said surface of the cylinder block to be abutted by the bearing member received in the recess to thereby achieve alignment of the aperture in all the bearing members. The parallel flat faces increase the contact area between bearing member and recess to improve the support, improve the gas sealing by eliminating leakage paths and, crucially, in the exhaust environment, increasing the heat transfer area between bearing member and cylinder block to enhance heat conduction away from the bearing member.

Conveniently, recesses are provided one each side of the exhaust passages of the cylinders at either end of the cylinder block with a co-operating bearing member. Thus each valve member may be rotatably supported on either side of the exhaust passage with which it is associated.

Preferably said exhaust passage extends to a planar surface on said one side of the cylinder block and said exhaust manifold has a complementary planar surface.

Conveniently, the recesses located between adjacent exhaust passages extend the complete distance between the passages so that, during manufacture, a suitable cutting tool can be used to machine the recesses and pass in a continuous cut from one exhaust passage to the next. It is desirable to also continue the cut from at least one end exhaust passage to an adjacent end face of the cylinder block. Preferably the cut extends from both end exhaust passages to the respective end faces of the cylinder block.

The ability to machine all of the recesses in a continuous pass of the cutting tool facilitates the accurate machining of the recesses to a uniform depth below the planar surface on the side of the block. This is important in ensuring that when the bearing members are assembled into the recesses, and clamped therein by the exhaust manifold, the apertures or bores in the bearing member are aligned and the end of each bearing member is flush with the planar surface on the side of the block.

Conveniently, each recess may be constructed so as to provide a secure seat for the bearing member at or adjacent each end of the recess with a relieved area therebetween. This reduces machining time and the problems associated with alignment of long continuous bearing surfaces. Preferably each valve member has a spigot projecting from either side thereof to be rotatably received in the bore in the respective bearing members on either side of the exhaust passage in which the valve member is located. The respective spigots extending from respective valves into opposite ends of the same bearing member bore are interconnected to rotate in unison. Preferably the spigots are connected in a manner to be tolerant to a limited degree of misalignment without binding in the bearing member bore.

The presently proposed construction avoids the previous practice of assembling the exhaust manifold to the side face of the cylinder block and boring a circular aperture through the length thereof with the axes thereof on the parting line between the manifold and the cylinder block. This prior practice exhibited several disadvantages. Firstly due to the length and small diameter of the bore, accurate machining was difficult. Secondly the manifold and block had to be assembled for machining and thirdly blocks and manifolds are not interchangeable. This third disadvantage is totally unacceptable in mass production engines.

Much of the above description of the invention has been on the basis of a multi-cylinder engine, however, it is to be understood that it is also applicable to single cylinder engines with a single exhaust port.

The invention will be more readily understood from the following description of one preferred practical arrangement of the invention as illustrated in the accompanying drawings.

Figure 1:
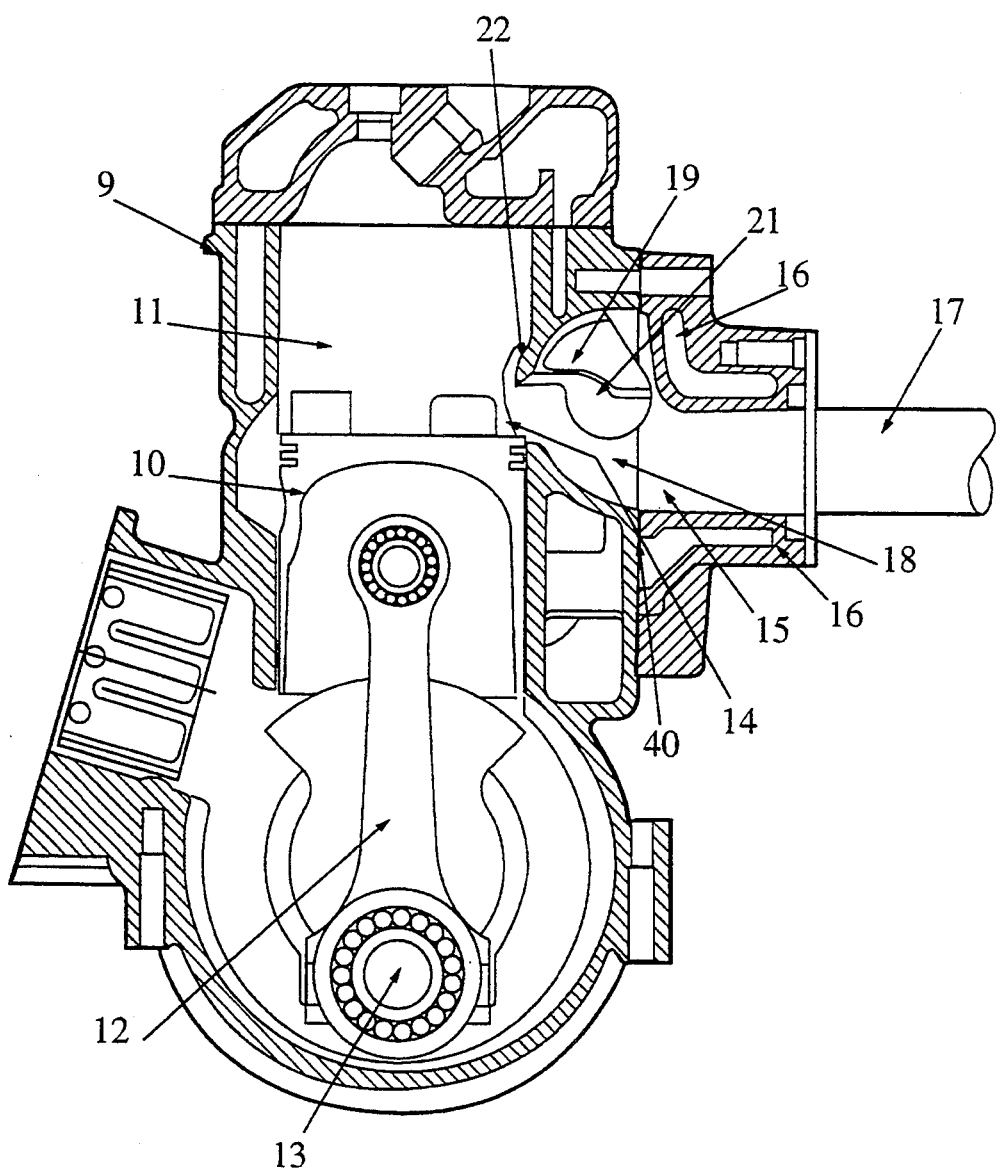
FIG. 1 is a transverse cross-sectional view of a multi cylinder two stroke cycle engine incorporating a power valve in conjunction with the exhaust port of each cylinder.

Referring now to FIG. 1 of the drawings, there is illustrated a multi-cylinder engine operating on the conventional two stroke cycle having cylinder block 9; a cylinder 11 therein, a piston 10 operating in the cylinder 11 and coupled by a connecting rod 12 to a crankshaft 13. An exhaust port 14 in the wall of the cylinder 11 communicates with an exhaust passage 15 in an exhaust manifold 16 which in turn communicates with an exhaust pipe 17. Within the cylinder block 9 there is provided an enlarged cavity 18 providing communication between the exhaust port 14 and the exhaust passage 15 in the manifold 16, and within the cavity 18 is a valve 19 commonly referred to as a power valve.

The power valve 19 is rotatable on the axis 21 extending in the longitudinal direction of the engine block 9 so that a leading edge 22 of the power valve 19 may be raised or lowered thereby adjusting the effective height of the upper or leading edge of the exhaust port 14. The general construction. function and operation of the power valve 19 is well known in the art of two stroke cycle engines and shall not be discussed in greater detail herein. Also there is disclosed in U.S. Pat. No. 4,920.932 a similar valve used in the control of the combustion process within the engine cylinder for the management of emission levels in the exhaust gas.

Figure 2:
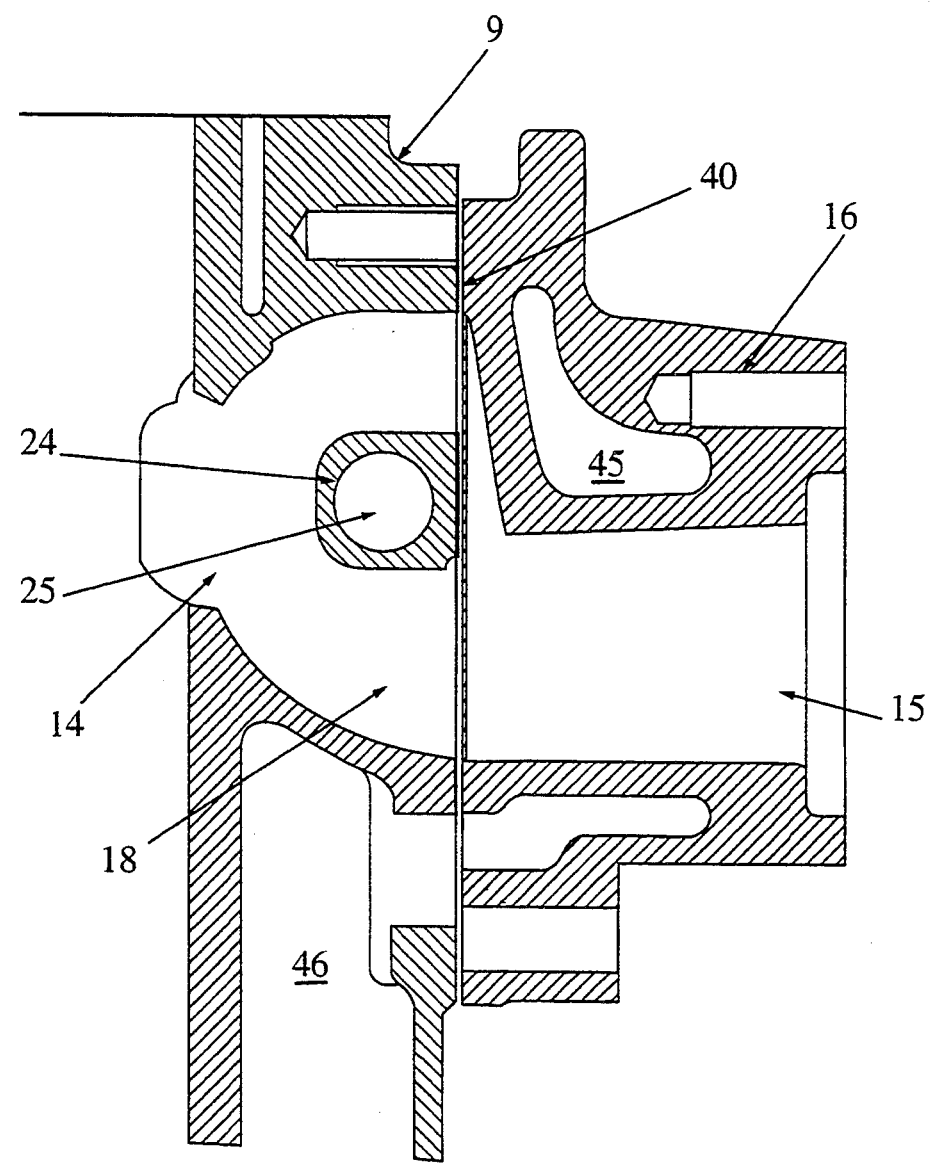
FIG. 2 is an enlarged view of the exhaust port area of the engine shown in FIG. 1 with the power valve and exhaust pipe removed.
Figure 3:
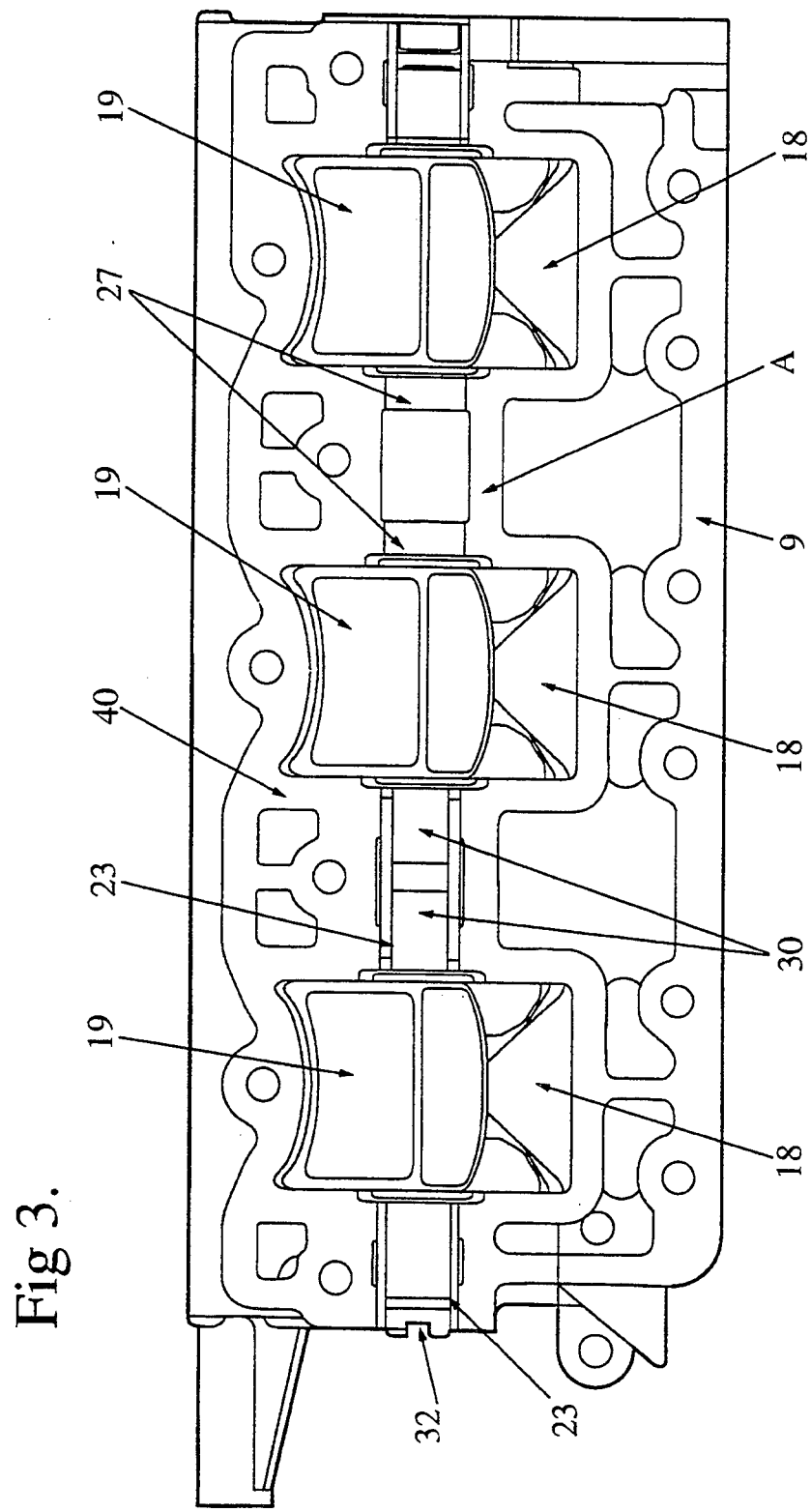
FIG. 3 is a longitudinal view of the engine with the power vanes and bearing box in place and the exhaust manifold removed.

As seen in FIGS. 2 and 3, a bearing member 24 is located on either side of each exhaust cavity 18, each bearing member 24 having a cylindrical bore 25 therethrough, with said bores 25 of all bearing members axially aligned. Each power valve 19 has a spigot or spindle 30 on each of the opposite sides thereof, co-axially arranged to provide the common pivot axis 21 of the respective power valves 19. Each spigot 30 is received in the bore 25 of a respective bearing member 24 on either side of the exhaust port 14. The spigots 30 of the respective exhaust port valves 19 of adjacent exhaust ports 14 are received in opposite ends of the bore 25 of the same bearing member 24, and are coupled to rotate in unison, for example, by interconnection using a tongue and slot principle. The construction of the coupling is selected to accommodate minor misalignment of the respective spigots 30 due to manufacturing tolerances.

As seen in FIG. 3, the spigot 30 of the power valve 19, located at the left hand end of the cylinder block, is longer than the spigot on the opposite side of that particular power valve 19 and of the other valves. The spigot 30 also has a diametrically located slot 32 in the end thereof, designed to receive a complementary tongue of a drive shaft of a motor provided to effect the rotation of the power valves in unison under the control of a suitably programmed ECU. The motor and drive shaft thereof are net shown as they are nol directly related to the present invention, and may be of any convenient construction.

Also as seen in FIG. 3 at A, the bearing member 24 at this location has been removed, together with the spigots 30, of the respective power valves 19 on either side thereof. There is thus revealed two spaced seats 27 provided in the cylinder block 9 upon which the bearing member 24 is located. The providing of the spaced seats 27 reduces machining time and allows more tolerance in machining.

Figure 4:
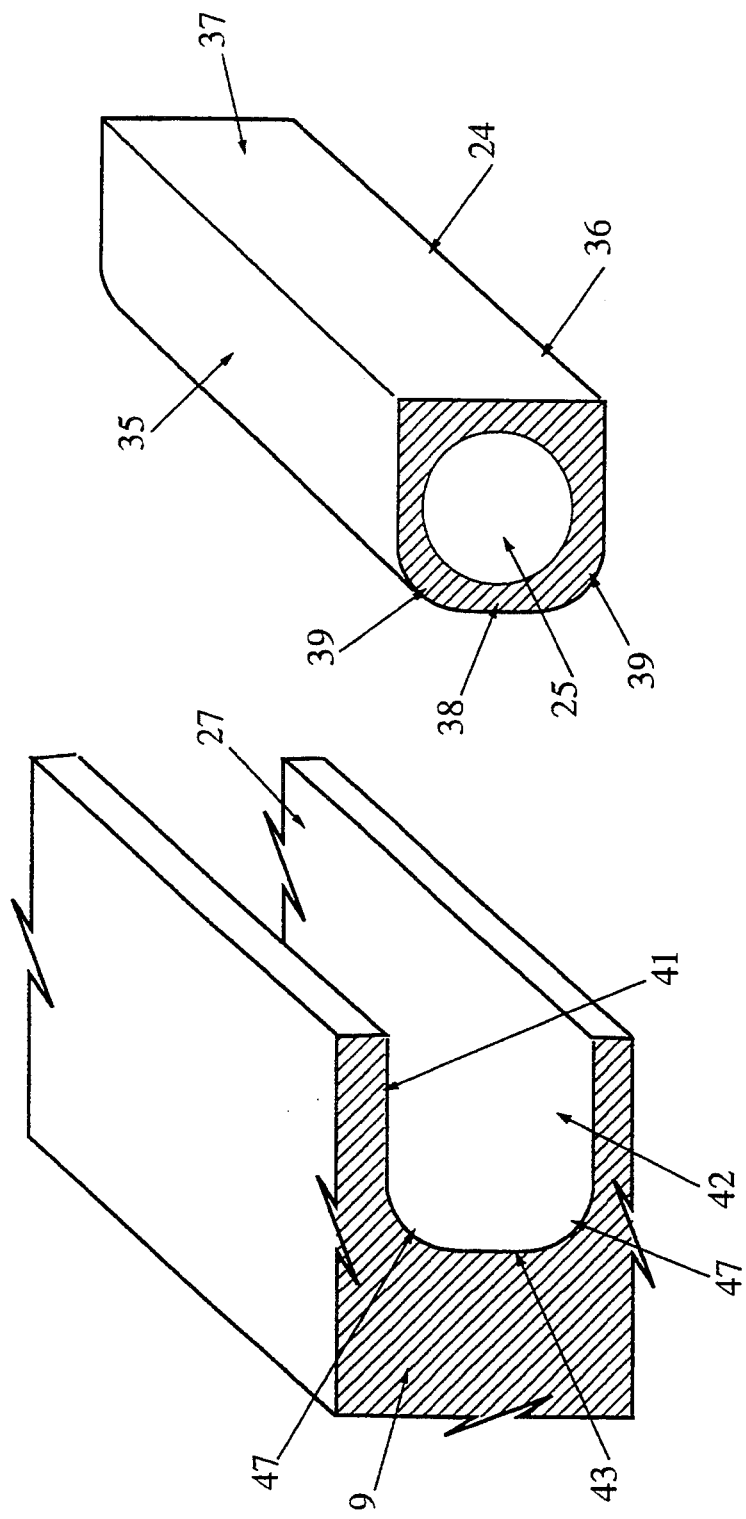
FIG. 4 is a perspective view of a recess and one bearing block.

Referring now to FIG. 4, each of the bearing members 24 has upper and lower parallel faces 35 and 36 and an outer flat face 37 at right angles to those upper and lower parallel flat faces 35 and 36. When in assembly faces 35 and 36 of bearing member 24 are in direct contact with complementary faces 41 and 42 in a seat 27 in the cylinder block 9 to provide significant areas of contact therebetween. This direct contact contributes to effective heat transfer from the power valve, through the bearing member to the cooling fluid circulating through the coolant passages 45 and 46 in the cylinder block.

The inner end face of the bearing member 24 has a central flat portion 38 parallel to the outer face 37 and normal to the upper and lower parallel faces 35 and 36. The flat portion 38 of each bearing member 24 abuts a complementary flat portion 43 provided in seat 27 thereby achieving alignment of the bore 25 of bearing members 24. The flat portion 38 smoothly blends with faces 35 and 36 respectively by arcuate inner end faces 39 having a radius sufficiently smaller radius than arcuate seat faces 47 of the seat 27 that there is no contact between faces 35 and 36 and faces 47. The overall dimension across the bearing member between faces 37 and 38 is such that when the bearing member is received in the seats 30 the face 37 of the bearing member is substantially flush with face 40 of the cylinder block. Thus when the manifold casting 16, having a planar surface 44 parallel to face 40, is assembled to the cylinder block and secured thereto by the appropriate attachment bolts, the bearing members 24 are firmly clamped in position in respective seats 30 by the exhaust manifold 16 as can be clearly seen in FIG. 2 of the drawings. A conventional gasket may be used between the manifold and the cylinder block in the conventional manner. The gasket is advantageous achieving an effective seal between the manifold and cylinder block by accommodating manufacturing tolerances.

It will be seen that the above construction enables the machining of the cylinder block to accommodate the pivotal support of the respective power valves to be carried out independently of the machining of the exhaust manifold with necessary advantages for mass manufacture. The machining of the seats for the bearing members in the cylinder block can be carried out in a breaching operation with a tool having the profile corresponding to that of the portion of the bearing member to be seated therein. Alternatively, the seats may be machined by a rotary cutter of the appropriate profile supported to rotate about an axis parallel to the face 40 of the cylinder block.

The claims defining the invention area as follows:

1. A two stroke cycle internal combustion engine having a cylinder block (9) with one or more cylinders (11) and a respective exhaust passage (15) communicating with the or each cylinder (11), and a valve member (19) associated with each exhaust passage (15), said valve members (19) being supported for pivotal movement relative to the respective passages (15) about a common axis (21) extending longitudinally of the block (9), each said exhaust passage (15) extending to a surface (40) on one side of the cylinder block (9) and an exhaust manifold (16) having a complementary surface (44) detachably secured to the cylinder block (9) with said surfaces (40,44) in abutting relation, characterised in that said surface (40) of the cylinder block (9) has a plurality of aligned recesses (27) therein with at least one recess (27) between each two adjacent exhaust passages (15), a bearing member (24) received in each recess (27), each bearing member (24) having an aperture (25) therethrough, said recesses (27) and bearing members (24) being configured so that the bearing members (24) are immobilely retained in the recesses (27) by the exhaust manifold (16) with the apertures (25) of the bearing members (24) being co-axial when the exhaust manifold (16) is detachably secured to the cylinder block (9), with the respective surfaces (40,44) in abutting relation, said valve members (15) being rotatably supported in said aligned apertures (25) of the bearing members (24).

2. An internal combustion engine as claimed in claim 1 characterised in that each bearing member (24) is provided with upper and lower parallel flat faces (35,36) in direct contact with complementary parallel flat faces in each recess (41,42).

3. An internal combustion engine as claimed in claim 1 characterised in that the base of each recess (27) is provided with a flat face portion (43) parallel to said surface (40) on the side of the cylinder block (9) and each bearing member (24) is also provided with a flat surface portion (38) complementary to and abutting the flat face portion (43) at the base of each recess.

4. An internal combustion engine as claimed in claim 1 characterised in that recesses are provided one on each side of said exhaust passage or passages (15) at either end of the cylinder block (9) and with a co-operating bearing member (24).

5. An internal combustion engine as claimed in claim 1 characterised in that said surface (40) on the cylinder block (9) and said surface (44) on the exhaust manifold (16) on each planar.

6. An internal combustion engine as claimed in claim 1 characterised in that the recesses (27) located between adjacent exhaust passages (15) extend the complete distance between the exhaust passages (15).

7. An internal combustion engine as claimed in claim 1 characterised in that in relation to an end exhaust passage (15), the recess (27) extends to an adjacent end face of the cylinder block (9).

8. An internal combustion engine as claimed in claim 1 characterised in that each valve member (19) has a spigot (30) projecting from either side thereof to be rotatably received in the aperture (25) in the respective bearing members (24) on either side of the exhaust passage (15) in which the valve member (19) is located and said spigot (30) is interconnected to the spigot (30) of an adjacent valve member (19) so that said plurality of valve members (19) rotates in unison.

* * * * *